United States Patent
Sato et al.

(10) Patent No.: US 7,727,098 B2
(45) Date of Patent: Jun. 1, 2010

(54) CHAIN TENSIONER

(75) Inventors: Seiji Sato, Iwata (JP); Satoshi Kitano, Iwata (JP); Yoshiaki Ryouno, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 12/081,832

(22) Filed: Apr. 22, 2008

(65) Prior Publication Data

US 2008/0268993 A1 Oct. 30, 2008

(30) Foreign Application Priority Data

Apr. 24, 2007 (JP) ............................. 2007-114157

(51) Int. Cl.
*F16H 7/08* (2006.01)
(52) U.S. Cl. ..................................... 474/111
(58) Field of Classification Search ................. 414/109, 414/110, 111
See application file for complete search history.

(56) References Cited

U.S. PATENT DOCUMENTS

| 5,700,213 | A | * | 12/1997 | Simpson et al. | 474/110 |
| 5,713,809 | A | * | 2/1998 | Yamamoto et al. | 474/110 |
| 5,961,410 | A | * | 10/1999 | Yamamoto | 474/110 |
| 5,993,342 | A | * | 11/1999 | Wigsten et al. | 474/110 |
| 6,431,133 | B2 | * | 8/2002 | Brandl et al. | 123/90.31 |
| 6,572,502 | B1 | * | 6/2003 | Young et al. | 474/111 |
| 2005/0049093 | A1 | * | 3/2005 | Sato et al. | 474/101 |
| 2006/0116229 | A1 | * | 6/2006 | Sato et al. | 474/110 |

FOREIGN PATENT DOCUMENTS

JP 64-41755 3/1989

* cited by examiner

*Primary Examiner*—John Q Nguyen
*Assistant Examiner*—Robert T Reese
(74) *Attorney, Agent, or Firm*—Wenderoth, Lind & Ponack, L.L.P.

(57) ABSTRACT

A chain tensioner includes a housing defining a cylinder chamber having a closed end. A cylindrical plunger having a closed front end is slidably received in the cylinder chamber. A nut member and a return spring are mounted in the cylinder chamber. The return spring biases the plunger outwardly of the housing to press its closed end against a pivotally supported chain guide. The nut member has a serration-shaped internal thread formed on the inner periphery thereof which is in threaded engagement with a serration-shaped external thread formed on the outer periphery of the screw rod. The screw rod is biased toward the closed end of the plunger by a rod spring. A damper is mounted between the front end of the screw rod and the closed front end of the plunger for damping, in cooperation with the return spring, a pushing force applied to the plunger, and for allowing the screw rod and the plunger to move relative to each other in a direction in which the distance between respective remote ends thereof decreases by an amount not less than an axial play present between the internal and external threads.

8 Claims, 2 Drawing Sheets

CHAIN TENSIONER

BACKGROUND OF THE INVENTION

This invention relates to a chain tensioner for keeping constant the tension of mainly a chain or a toothed belt for driving camshafts.

Ordinarily, a chain transmission device comprising a sprocket mounted on one end of a crankshaft, sprockets mounted on ends of camshafts, and a chain trained around the sprockets to drive the camshafts further includes a chain guide pivotable toward a slack side of the chain, and a chain tensioner for applying an adjusting force to the chain guide to press the chain guide against the chain, thereby keeping constant the tension of the chain.

A chain tensioner used in such a chain transmission device is disclosed in JP Utility Model Publication 64-41755. This chain tensioner includes a body, a nut member having a rod at its front end and slidably inserted in the body, and a bolt member having a serration-shaped external thread formed on the outer periphery thereof and in threaded engagement with a serration-shaped internal thread formed on the inner periphery of the nut member. A return spring is mounted in the body to bias the nut member outwardly of the body. The serration-shaped threads have pressure flanks which receive a pushing force applied from the chain to the rod of the nut member through the chain guide, thereby preventing retraction of the nut member. While the pushing force is greater than the force of the return spring, the nut member retracts while rotating until the pushing force balances with the force of the return spring, thereby keeping constant the tension of the chain.

When the chain slackens, the nut member is pushed out while rotating under the force of the return spring, thereby re-tensioning the chain.

With this conventional chain tensioner, because the rod of the nut member has its front end in contact with the pivotable chain guide, when the chain guide pivots, turning moment acts on the nut member that tends to incline the nut member. Such turning moment directly acts on the portions of the internal and external threads that are in threaded engagement with each other.

Also, if, due e.g. to mounting errors, the front end of the rod is in contact with the chain guide at its point offset from its center, torque is applied to the nut member when the chain guide pivots.

Since the turning moment applied to the nut member directly acts on the serration-shaped threads, the serration-shaped threads may bite each other, thereby locking the nut member.

When torque is applied to the nut member, the nut member is moved axially while rotating. Thus, when such torque is applied while the tension of the chain is increasing, the resistance to vibration of the chain decreases. This impairs stable operation of the serration-shaped threads, thereby making it impossible to keep constant the tension of the chain.

If the chain vibrates with an amplitude larger than the axial play between the internal and external threads, because the nut member is prevented from retracting due to the contact between the pressure flanks of the internal and external threads, the nut member moves outwardly every time the chain slackens. Thus, the chain tends to be over-tensioned, so that its life is shortened.

An object of this invention is to provide a chain tensioner which operates stably at all times by preventing turning moment or torque applied from a pivotable chain guide from being transmitted to serration-shaped threads, and which can prevent over-tensioning of the chain.

SUMMARY OF THE INVENTION

To achieve this object, the present invention provides a chain tensioner comprising a housing defining a cylinder chamber having a closed end and an open end, a cylindrical plunger having a closed front end and slidably received in the cylinder chamber, the cylinder chamber having an annular seal groove formed in an inner periphery thereof near the open end, a seal member received in the seal groove for sealing a gap between sliding surfaces of the cylinder chamber and the plunger, thereby preventing leakage of lubricating oil filling the cylinder chamber, a nut member mounted in the cylinder chamber and having an internal thread formed on an inner periphery thereof, a return spring mounted in the cylinder chamber for pressing the nut member against the closed end of the cylinder chamber and biasing the plunger outwardly of the housing, a screw rod having an external thread formed on an outer periphery thereof and in threaded engagement with the internal thread of the nut member, a rod spring mounted behind the screw rod for biasing the screw rod toward the closed front end of the plunger, each of the internal thread of the nut member and the external thread of the screw rod comprising a pressure flank for receiving a pushing force applied from the plunger to the screw rod, and a clearance flank, the pressure flank having a greater flank angle than the clearance flank, each of the internal thread and the external thread having a serration-shaped longitudinal section, and a damper mounted between a front end of the screw rod and the closed front end of the plunger for damping, in cooperation with the return spring, a pushing force applied to the plunger, and for allowing the screw rod and the plunger to move relative to each other in a direction in which the distance between respective remote ends thereof decreases by an amount not less than an axial play present between the internal and external threads.

The damper may comprise a cylindrical body having a rear open end opposing the screw rod and having a radially inwardly bent piece formed at the rear open end, a stopper which is axially slidably mounted in the cylindrical body and prevented from coming out of the cylindrical body by the inwardly bent piece, and a spring member biasing the stopper toward the bent piece.

The spring member may be a coil spring or a wave spring made of a plate-shaped spring material.

With this arrangement, the return spring biases the plunger outwardly of the cylinder chamber. The plunger thus presses the pivotally supported chain guide against the chain to apply tension to the chain. When the chain slackens, the return spring pushes out the plunger to re-tension the chain.

When the chain is tensioned, the pushing force applied from the chain to the plunger through the chain guide is damped by the damper and the return spring.

When the plunger is further pushed in after the damper contracts by a predetermined amount until the plunger and the screw rod cannot move relative to each other in a direction in which the distance between their remote ends decreases, the pressure flanks of the internal thread of the nut member and the external thread of the screw rod are pressed against each other, thereby receiving the pushing force. This prevents retraction of the plunger.

While the pushing force is larger than the force of the return spring, the screw rod retracts while rotating until the pushing force balances with the force of the return spring, thereby keeping constant the tension of the chain.

Because the tension of the chain is adjusted by the pivoting motion of the chain guide when the adjusting force of the chain guide is applied to the chain guide, a turning moment acts on the plunger that tends to incline the plunger when the chain guide pivots. Also, if the front end surface of the plunger is in contact with the chain guide at its point offset from the center of the front end surface due to mounting errors, turning torque is applied to the plunger when the chain guide pivots.

But according to the present invention, because the damper is mounted between the plunger and the screw rod with the front end surface of the screw rod in contact with the damper, even if a turning moment and/or turning torque acts on the plunger, such turning moment or torque is never transmitted to the screw rod. It is thus possible to prevent biting of the serration-shaped threads, and also prevent reduced resistance to vibrations of the chain when the chain is tensioned, thereby keeping constant the tension of the chain at all times.

Preferably, the screw rod and the stopper are in point contact or spherical-surface-to-spherical-surface contact with each other to more effectively prevent the turning moment or turning torque from being transmitted to the screw rod.

Because the turning moment or turning torque applied from the chain guide to the plunger is never transmitted to the screw rod, the internal thread of the nut member and the external thread of the screw rod operate stably.

Also, because a damper is mounted between the front end of the screw rod and the closed end of the plunger which allows the screw rod and the plunger to move relative to each other in a direction in which the distance between respective remote ends thereof decreases by an amount not less than an axial play present between the internal and external threads, even if the chain vibrates with an amplitude larger than the axial play between the internal and external threads, it is possible to absorb such vibrations with the damper and the return spring. This prevents over-tensioning of the chain. The damper may be provided with a stopper to prevent excessive relative movement between the screw rod and the plunger.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENTS

Figure 1:
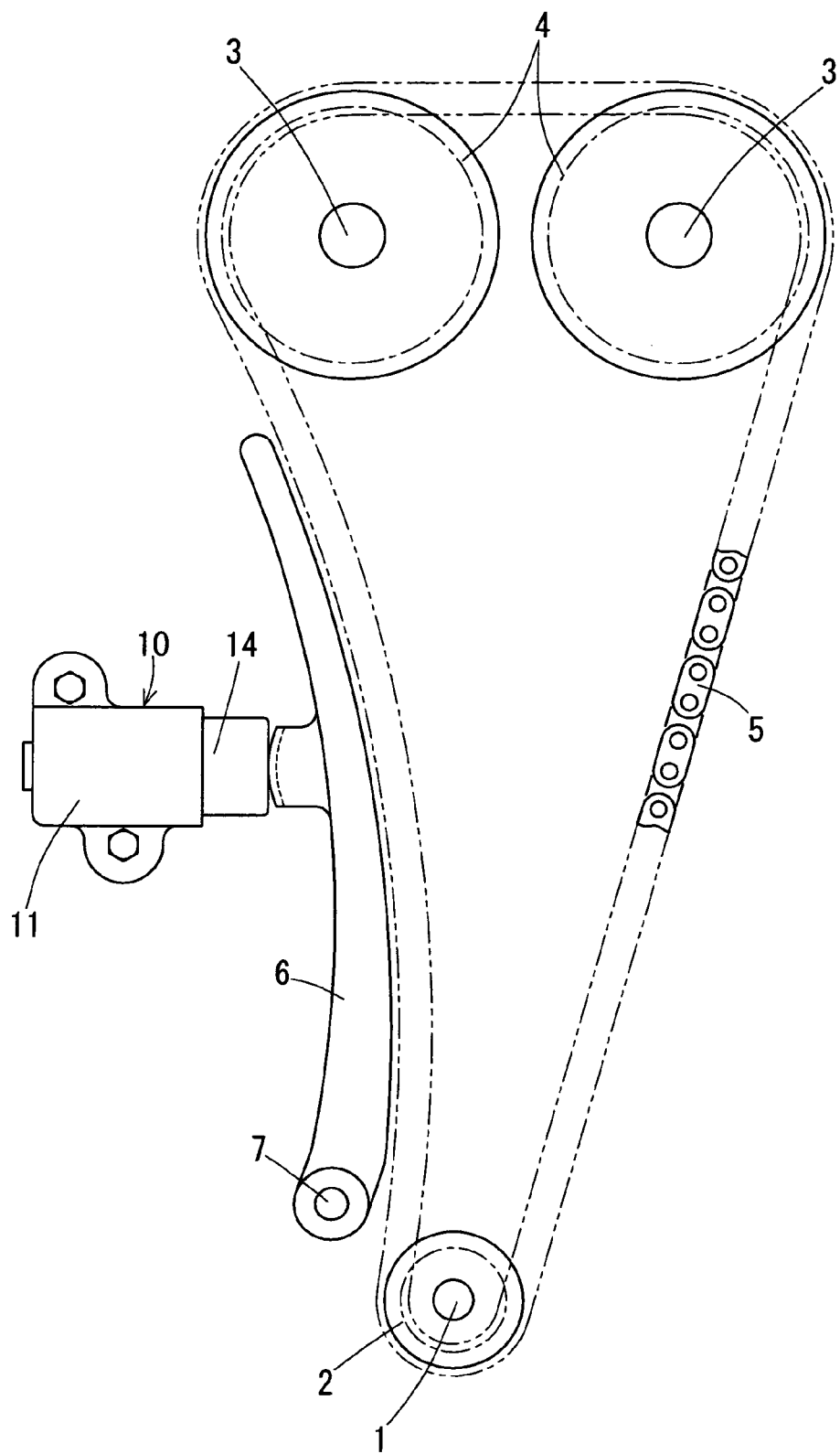
FIG. 1 is a schematic view of a tension adjusting device for a chain in which the chain tensioner according to the present invention is used.

An embodiment of the invention is now described with reference to the drawings. FIG. 1 shows a tension adjusting device for a camshaft driving chain. As shown, the camshaft driving chain 5 is trained around a sprocket 2 mounted to an end of a crankshaft 1 and sprockets 4 each mounted on an end of one of camshafts 3. A chain guide 6 extends along a slack side of the chain 5.

The chain guide 6 is pivotable about a shaft 7 provided at its lower end, and is pressed against the chain 5 under the adjusting force applied from a chain tensioner 10.

Figure 2:
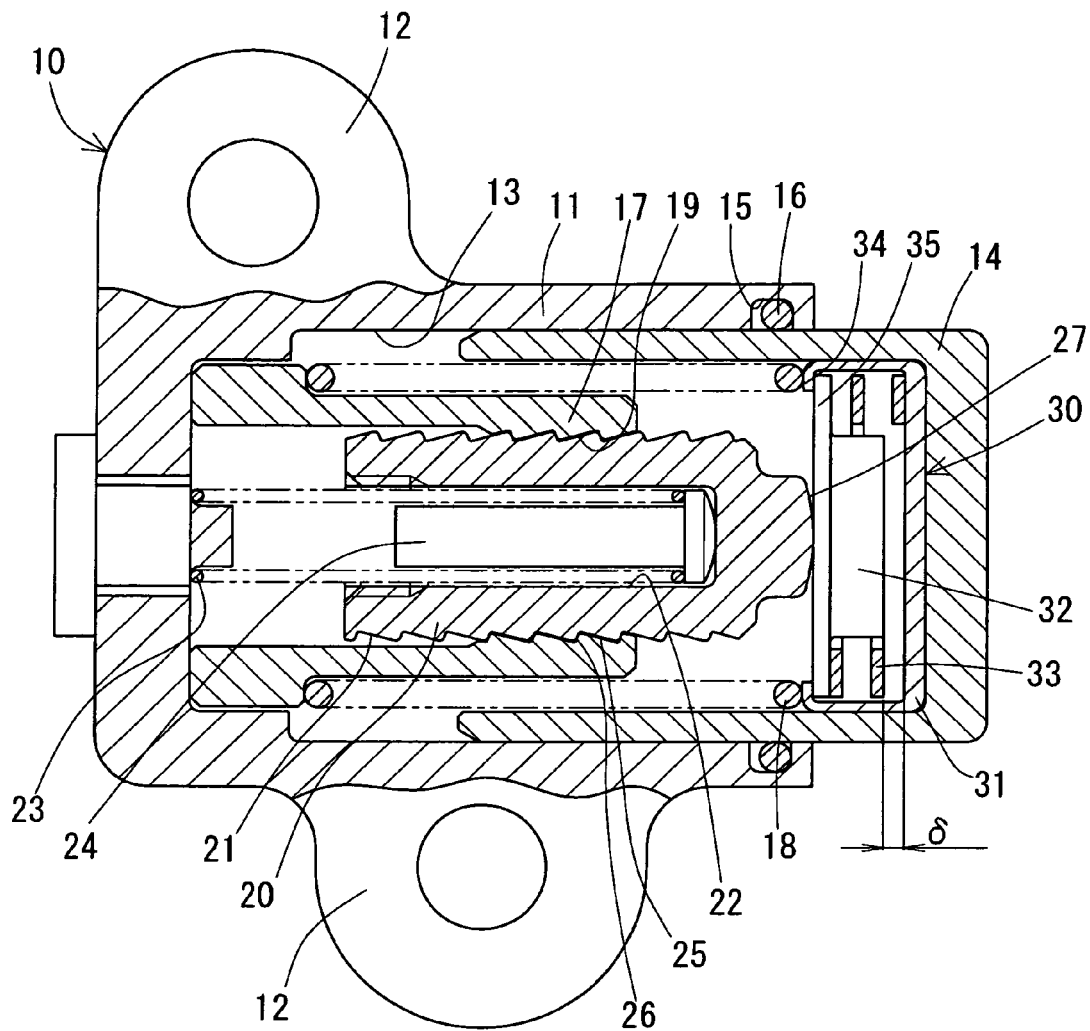
FIG. 2 is a vertical sectional front view of the chain tensioner according to the present invention.

As shown in FIG. 2, the chain tensioner 10 includes a housing 11 having on its outer periphery mounting pieces 12 which are bolted to an engine block.

In the housing 11, a cylinder chamber 13 is defined having one end closed and the other end open. A plunger 14 is slidably inserted in the cylinder chamber 13. The plunger 14 is a cylindrical member having a closed end which abuts the chain guide 6.

The plunger 14 may be formed by turning but is more preferably formed by pressing because turning is more time-consuming and thus costly.

An annular seal groove 15 is formed in the inner periphery of the cylinder chamber 13 near its open end. A seal member 16 in the form of an O-ring is received in the seal groove 15 with its inner periphery in elastic contact with the outer periphery of the plunger 14 to seal the gap between the sliding surfaces of the cylinder chamber 13 and the plunger 14, thereby preventing leakage of lubricating oil filling the cylinder chamber 13.

A nut member 17 and a return spring 18 are mounted in the cylinder chamber 13. The return spring 18 presses the nut member 17 against the closed end of the cylinder chamber 13, and also presses the plunger 14 against the chain guide 6.

The nut member 17 has an internal thread 19 on its inner periphery which is in threaded engagement with an external thread 21 formed on the outer periphery of a screw rod 20. The screw rod 20 is formed with a spring-receiving bore 22 having a rear open end. A rod spring 23 and a spring seat 24 are disposed between the closed end surface of the spring-receiving bore 22 and the closed end surface of the cylinder chamber 13. The rod spring 23 biases the screw rod 20 toward the closed end of the plunger 14.

Each of the internal thread 19 formed on the inner periphery of the nut member 17 and the external thread 21 formed on the outer periphery of the screw rod 20 has a pressure flank 25 which receives the force under which the screw rod 20 is pushed in, and a clearance flank 26. The pressure flank 25 has a greater flank angle than the clearance flank 26, so that the threads 19 and 21 have a serration-shaped longitudinal section. Also, the serration-shaped threads 19 and 21 have such a lead angle that the screw rod 20 is moved axially while rotating under the force of the rod spring 23.

The screw rod 20 has a spherical front end surface 27. Between this spherical surface 27 and the closed end surface of the plunger 14, a damper 30 is mounted. The damper 30 comprises a cylindrical body 31 having open and closed ends, and a stopper 32 and a spring member 33 that are mounted in the cylindrical body 31.

Radially inwardly bent pieces 34 are provided at the open end of the cylindrical body 31 to prevent separation of the stopper 32 in the cylindrical body 31. The cylindrical body 31 is mounted in the plunger 14 with its open end located opposed to the screw rod 20, and is pressed against the closed end of the plunger by the return spring 18.

The stopper 32 is a columnar member having at one end thereof a flange 35 adapted to abut the bent pieces 34 of the cylindrical body 31. By abutting the flange 35, the bent pieces 34 prevent the stopper 32 from coming out of the cylindrical body 31 through its open end.

The spring member 33 biases the stopper 32 toward the open end of the cylindrical body 31, thereby bringing the flange 35 into abutment with the bent pieces 34. With the flange 35 in abutment with the bent pieces 34, an axial gap δ is present between the front end surface of the stopper 32 and the closed end of the cylindrical body 31. While the axial gap δ has to be set at an optimum value according to the engine, it is preferably set in the range of 0.2 mm to 2.0 mm.

In the embodiment shown, the spring member 33 is a coil spring made of a plate-shaped spring material, but is not limited thereto. For example, it may be a wave spring. The spring member 33 has a larger spring force than the rod spring 23.

In cooperation with the return spring 18, the damper 30 damps the pushing force applied to the plunger 14, while permitting the relative movement of the screw rod 20 and the plunger 14 in the direction in which the distance between the respective remote ends of the screw rod 20 and the plunger 14 decreases within the range of the axial gap δ.

With the chain tensioner 10 mounted in position as shown in FIG. 1, when the engine is started, and the chain 5 vibrates such that its slack side slackens due e.g. to fluctuations in torque resulting from the rotation of the camshafts 3, the plunger 14 is pushed out by the return spring 18, and presses the chain guide 6. The chain guide 6 thus pivots and re-tensions the chain 5.

Simultaneously, the screw rod 20 is pushed by the rod spring 23 in the same direction as the plunger 14 until its spherical front end surface 27 abuts the stopper 32.

When the tension of the slack side of the chain 5 increases, and a pushing force is applied from the chain 5 to the plunger 14 through the chain guide 6, the spring member 33 of the damper 30 and the return spring 18 are elastically deformed, thereby damping the pushing force.

When the spring member 33 of the damper 30 contracts by a predetermined amount, the stopper 32 abuts the closed end of the cylindrical member 31, so that the stopper 32 and the cylindrical member 31 cannot move any further relative to each other in the direction in which the distance between their respective remote ends decreases. When the plunger 14 is further pushed in, the pressure flanks 25 of the internal thread 19 of the nut member 17 and the external thread 21 of the screw rod 20 are pressed against each other, thereby supporting the pushing force applied to the plunger 14. This prevents retraction of the plunger 14.

While this pushing force is greater than the spring force of the return spring 18, the screw rod 20 slowly retracts while rotating until the pushing force balances with the spring force of the return spring 18. The tension of the chain 5 is thus kept constant.

Because the tension of the chain 5 is adjusted by the pivoting motion of the chain guide 6 under the adjusting force applied thereto from the chain tensioner, when the chain guide 6 pivots, a turning moment acts on the plunger 14 and tends to incline the plunger 14. Also, if, due to mounting errors, the front end surface of the plunger 14 is in contact with the chain guide 6 at its point offset from its center, torque is applied to the plunger 14 when the chain guide 6 pivots.

But according to the present invention, because the damper 30 is mounted between the plunger 14 and the screw rod 20, and the front end surface of the screw rod 20 is in contact with the stopper 32 of the damper 30, any turning moment and/or torque applied to the plunger 14 is never transmitted to the screw rod 20.

Because any turning moment and/or torque applied to the plunger 14 is never transmitted to the screw rod 20, the serration-shaped internal and external threads 19 and 21 of the nut member 17 and the screw rod 20 can operate stably and reliably.

Figure 3:
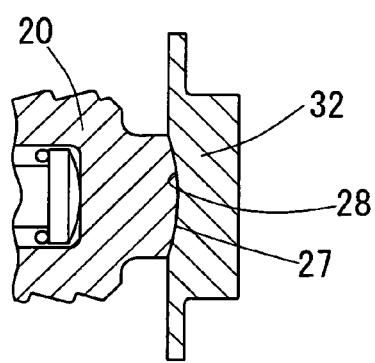
FIG. 3 is a sectional view of a screw rod and a stopper that are in contact with each other in a different manner.

Preferably, the screw rod 20 and the stopper 32 are in point contact with each other as shown in FIG. 2, because with this arrangement, it is possible to more effectively prevent any turning moment and/or torque applied to the plunger 14 from being transmitted to the screw rod 20. For this purpose, instead of such point contact, as shown in FIG. 3, the convex spherical front end surface 27 of the screw rod 20 may be brought into surface contact with concave spherical surface 28 formed in the end surface of the stopper 32.

As shown in FIG. 2, by mounting the damper 30, which allows the screw rod 20 and the plunger 14 to move relative to each other in the direction in which the distance between their respective remote ends decreases within the axial play between the internal and external threads 19 and 21, between the front end of the screw rod 20 and the closed end of the plunger 14, even if the chain 5 vibrates with an amplitude greater than the axial play between the internal and external threads 19 and 21, the vibration can be absorbed with the spring member 33 of the damper 30 and the return spring 18. This prevents over-tensioning of the chain 5.

What is claimed is:

1. A chain tensioner comprising a housing defining a cylinder chamber having a closed end and an open end, a cylindrical plunger having a closed front end and slidably received in said cylinder chamber, said cylinder chamber having an annular seal groove formed in an inner periphery thereof near said open end, a seal member received in said seal groove for sealing a gap between sliding surfaces of said cylinder chamber and said plunger, thereby preventing leakage of lubricating oil filling said cylinder chamber, a nut member mounted in said cylinder chamber and having an internal thread formed on an inner periphery thereof, a return spring mounted in said cylinder chamber for pressing said nut member against said closed end of said cylinder chamber and biasing said plunger outwardly of said housing, a screw rod having an external thread formed on an outer periphery thereof and in threaded engagement with said internal thread of said nut member, a rod spring mounted behind said screw rod for biasing said screw rod toward said closed front end of said plunger, each of said internal thread of said nut member and said external thread of said screw rod comprising a pressure flank for receiving a pushing force applied from said plunger to said screw rod, and a clearance flank, said pressure flank having a greater flank angle than said clearance flank, each of said internal thread and said external thread having a serration-shaped longitudinal section, and a damper mounted between a front end of said screw rod and said closed front end of said plunger for damping, in cooperation with said return spring, a pushing force applied to said plunger, and for allowing said screw rod and said plunger to move relative to each other in a direction in which the distance between respective remote ends thereof decreases by an amount not less than an axial play present between said internal and external threads, wherein said damper comprises a stopper for restricting the relative movement between said screw rod and said plunger in said direction, and wherein said damper comprises a cylindrical body having a rear open end opposing said screw rod and having a radially inwardly bent piece formed at said rear open end, said stopper, which is axially slidably mounted in said cylindrical body and prevented from coming out of said cylindrical body by said inwardly bent piece, and a spring member biasing said stopper toward said bent piece.

2. The chain tensioner of claim 1 wherein said spring member is a coil spring or a wave spring made of a plate-shaped spring material.

3. The chain tensioner of claim 1 wherein said screw rod and said stopper are in spherical-surface-to-spherical-surface contact with each other.

4. The chain tensioner of claim 1 wherein said screw rod and said stopper are in spherical-surface-to-spherical-surface contact with each other.

5. The chain tensioner of claim 2 wherein said screw rod and said stopper are in spherical-surface-to-spherical-surface contact with each other.

6. The chain tensioner of claim 1, wherein said plunger is constituted by a hollow cylindrical member having an open rear end opposite said closed front end.

7. The chain tensioner of claim 6, wherein said screw rod projects into said hollow cylindrical member constituting said plunger through said open rear end of said plunger.

8. The chain tensioner of claim 1, wherein said screw rod and said plunger constitute separate and discrete members that are arranged in said cylinder chamber so as to be movable relative to one another.

\* \* \* \* \*